United States Patent [19]

Chang

[11] Patent Number: 5,133,564
[45] Date of Patent: Jul. 28, 1992

[54] PISTON RING ASSEMBLY FOR STIRLING ENGINE

[75] Inventor: Seok M. Chang, Seoul, Rep. of Korea

[73] Assignee: Goldstar Co., Ltd., Seoul, Rep. of Korea

[21] Appl. No.: 540,205

[22] Filed: Jun. 19, 1990

[30] Foreign Application Priority Data

Jun. 30, 1989 [KR] Rep. of Korea ............... 9418/1989

[51] Int. Cl.⁵ .............................................. F16J 9/16
[52] U.S. Cl. ................................... 277/193; 277/136; 277/138; 277/197; 277/216
[58] Field of Search ................... 277/193–199, 277/136, 137, 138, 117, 216, 217, 222

[56] References Cited

U.S. PATENT DOCUMENTS

| | | | |
|---|---|---|---|
| 1,126,898 | 2/1915 | Sorensen | 277/197 |
| 1,188,713 | 6/1916 | Baker | 277/197 |
| 1,280,493 | 10/1918 | Kurtz | 277/198 |
| 1,309,609 | 7/1919 | Bryant | 277/197 |
| 1,369,075 | 2/1921 | Ballman | 277/217 |
| 1,370,342 | 3/1921 | Miller | 277/197 |

FOREIGN PATENT DOCUMENTS

| | | | |
|---|---|---|---|
| 0523008 | 4/1921 | France | 277/193 |
| 0015914 | of 1913 | United Kingdom | 277/197 |
| 0107180 | of 1917 | United Kingdom | 277/197 |

Primary Examiner—William A. Cuchlinski, Jr.
Assistant Examiner—Daniel G. DePumpo

[57] ABSTRACT

A piston ring assembly for use in a stirling engine, which includes main rings each having a slit and a slanted surface for preventing ring rotations against one another wherein the main rings are engaged in a ring groove disposed at the exterior of a piston, and a tensional ring having a slit and being engaged in the interior of the ring groove, whereby upon tightly contacting the main rings to the interior surface of a cylinder by a tensional force of the tension ring and preventing main ring rotations against one another by oppositely positioning the slanted surfaces, operational gas leakages are prevented and a good sealing effect for the stirling engine is achieved with fewer body parts.

2 Claims, 2 Drawing Sheets

PISTON RING ASSEMBLY FOR STIRLING ENGINE

BACKGROUND OF THE INVENTION

1. Field of the Invention

The present invention relates to a piston ring assembly for a Stirling engine and particularly, to an improved piston ring assembly for use in a Stirling engine so as to reduce the number of parts thereof so that the piston ring assembly is simple in construction, inexpensive to manufacture, durable in use, and easy in assembly.

2. Description of the Prior Art

Generally, various types of piston rings for use in a Stirling engine mounted on an external circumferential surface of a piston and inserted into the interior of a cylinder are well known in the art. Such piston rings are closely connected to the internal peripheral surface of the cylinder for preventing operational gas from leaking into the interior of the cylinder through a gap between the piston and the cylinder. And since such piston rings for use in the Stirling engine have to execute a tight sealing operation for a non-lubricating state, such piston rings are made of teflon resin for executing the sealing operation and self-lubricating operation without using a cast iron ring.

One of such conventional piston rings for use in a Stirling engine is illustrated in FIGS. 1 to 4. As shown in FIGS. 1 to 4, the piston ring includes one pair of main rings 6 and 7. The main rings 6 and 7 are provided with an inner ring 8 for preventing the rotation of the main rings 6 and 7 and a tensional ring 9 for giving a tensional force to the inner ring 8 to engage with a ring groove 1a formed at the external circumferential surface of a piston 1 so as to tightly close the main rings 6 and 7 the interior surface of a cylinder 5.

Moreover, slits 6a, 7a, 8a, and 9a are formed at the main rings 6 and 7, the inner ring 8, and the tensional ring 9, respectively. The main rings 6 and 7 are engaged with the ring groove 1a of the piston 1 in which two rings 6 and 7 are necessarily superposed in order to prevent the operational gas from leaking through the slits 6a and 7a. Also, the operational gas leaks out when the main rings 6 and 7 are rotated around. Therefore, the slits 6a and 7a thereof are oppositely positioned. A pair of protrusions 8b are formed at the external circumferential surface of the inner ring 8 for being adapted to engage with the slits 6a and 7a of the main rings 6 and 7 so as to lock the slits in opposite side of one another and to prevent the main rings 6 and 7 from rotating around by themselves.

Furthermore, the tensional ring 9 gives a tensional force to the main rings 6 and 7 so that the main rings 6 and 7 are rendered to contact the internal peripheral surface of the cylinder 5 closely.

However, since the conventional piston ring structure as aforementioned is comprised of four kinds of parts such as two main rings, an inner ring, and a tensional ring, they have a number of disadvantages in that many parts are required and are complicated in construction, expensive to manufacture, and inconvenient for use.

SUMMARY OF THE INVENTION

Accordingly, it is an object of the present invention to provide an improved piston ring assembly, which is simple in construction, economical to manufacture, and durable in use.

Another object of the present invention is to provide a piston ring assembly for use in a Stirling engine, which includes one pair of upper and lower main rings to be inserted in superposing one another to upper and lower positions respectively, to the exterior portions of ring grooves disposed at the external circumferential surface of the piston, and a tensional ring for closely contacting the upper and lower main rings to the internal peripheral surface of a cylinder by being inserted into the interior of the ring grooves of the piston. The main rings and the tensional ring are provided with slits disposed at a body thereof, respectively and a rotation preventing means disposed at the contacting surface of the upper and lower main rings for preventing the rotation of the main rings. One exemplary form of the rotation preventing means for the upper and lower main rings is slanted surfaces positioned to one another oppositely so that each slit of the upper and lower main rings formed at the thick body portion thereof opposes one another. Thus the upper and lower main rings are engaged in the external peripheral portion of the ring groove of the piston by superposing each slit of the upper and lower main rings oppositely while the tensional ring is engaged in the interior of the ring groove. Therefore, the upper and lower rings are closely contacted to the internal peripheral surface of the cylinder by the resilient force of the tensional ring.

A further object of the present invention is to provide a piston ring assembly for use in a Stirling engine, which is simple in construction, inexpensive to manufacture, and durable in use.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a piston ring assembly for use in a Stirling engine, which includes main rings each having a slit and a slanted surface for preventing main ring rotations wherein the main rings are engaged in a ring groove disposed at the exterior of a piston is a tensional ring having a slit and engaged in the interior of the ring groove disposed at the piston, whereby upon tightly contacting the main rings to the internal surface of a cylinder of a Stirling engine, the main rings do not rotate around even without using any inner rings for, thus reducing the number of parts thereof and achieving a number of advantages such as, for example, the piston ring assembly becomes simple in construction, inexpensive to manufacture, and durable in use.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 5:
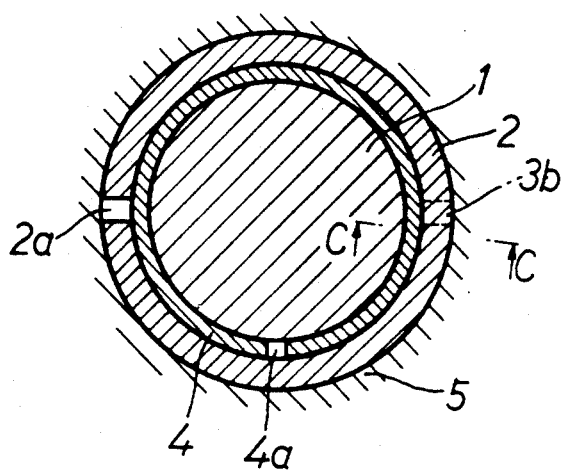
FIG. 5 is a cross-sectional view of the piston ring assembly according to the present invention in an assembled position.
Figure 6:
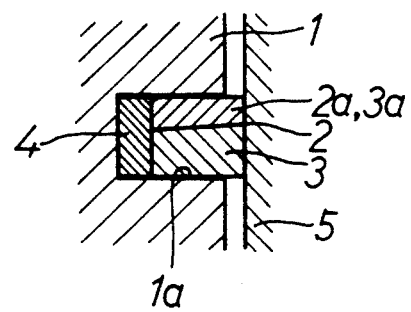
FIG. 6 is an enlarged cross-sectional view of FIG. 5, taken along the line C—C.
Figure 7:
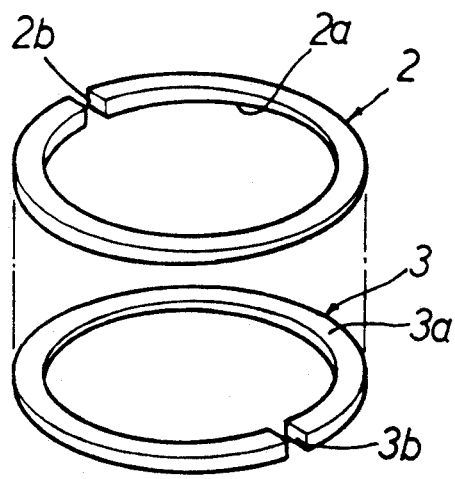
FIG. 7 is an exploded perspective view of the main rings each having a slanted surface according to the present invention.

Referring now in detail to the drawings for the purpose of illustrating preferred embodiments of the present invention, the wall as shown in FIGS. 5, 6, and 7 comprises a pair of main rings 2 and 3 adapted to engage with a ring groove 1a of a piston 1 and each main ring 2 or 3 having a slanted surface with oppositely changing ring thickness to the other. Therefore, slanted surfaces 2a and 3a are coupled so as to oppositely position the thick portions of the rings. The main rings 2 and 3 further include slits 2b and 3b formed at thicker positions thereof, respectively to be positioned always in the opposite direction of one another and a tensional ring 4 having a slit 4a for assembly with the interior thereof. Since the slanted surfaces 2a and 3a are disposed on the main rings 2 and 3, when these slant surfaces 2a and 3a are coupled so as to position the thick positions opposite to one another, the overall thickness of the main rings 2 and 3 together becomes even throughout the entire ring but the ring rotations are prevented due to the slanted surfaces.

Figure 1:
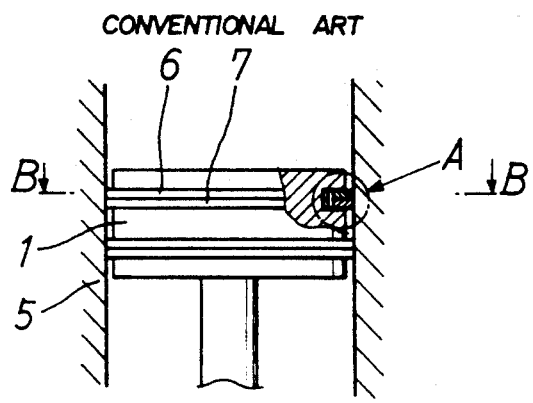
FIG. 1 is a sectional view of a conventional piston ring containing cut away portions in order to illustrate the construction thereof.
Figure 2:
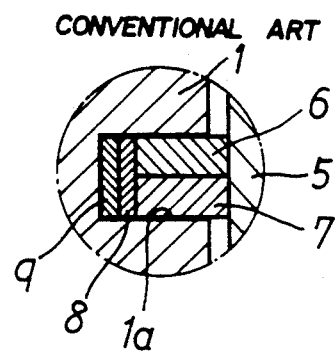
FIG. 2 is an enlarged sectional view for showing the portion A of FIG. 1.
Figure 3:
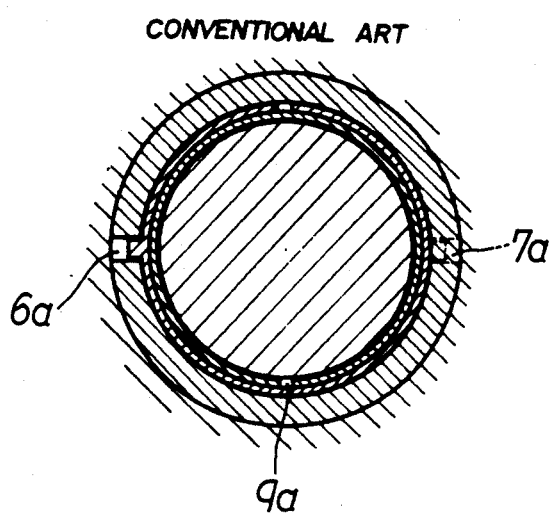
FIG. 3 is a cross-sectional view of FIG. 1, taken along the line B—B.
Figure 4:
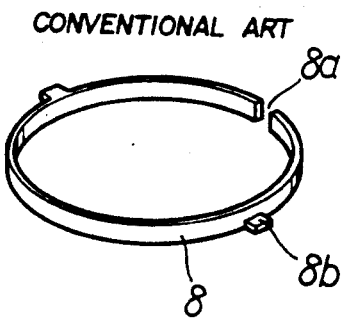
FIG. 4 is a perspective view of an inner ring used in the conventional piston ring.

Therefore, when the main rings 2 and 3 are assembled with the ring groove 1a of the piston 1, it is possible to prevent ring rotations even without using the separate inner ring 9 of the conventional piston ring shown in FIG. 2. Since the main rings 2 and 3 do not turn around against one another after being assembled, the leakage of the operational gas caused by the lining of both slits 2b and 3b can be avoided.

Moreover, the appropriate surface pressure required between the main rings 2 and 3 and the cylinder 5 is maintained by the tensional ring 4 having a slit 4a.

Since the upper and lower main rings 2 and 3 are closely contacted to the internal peripheral surface of the cylinder 5 by a resilient force of the tensional ring 8, the leakage of the operational gas between the cylinder 5 and the piston 1 is prevented. And since the upper and lower main rings 2 and 3 are provided with a rotation preventing means such as the slanted surfaces 2a and 3a thereby being contacted oppositely, the upper and lower main rings 2 and 3 do not rotate around against one another, and accordingly, since each slit 2b or 3b of the upper and lower main rings 2 and 3 is positioned always opposite to one another in a state of being assembled, the operational gas is not leaked through the slits of the upper and lower main rings.

Accordingly, the present invention is provided with improved main rings 2 and 3 in which individual ring rotations are prevented without using a separate inner ring. Therefore, in the piston assembly according to the present invention, the number of the parts can be reduced and the piston assembly is simple in construction, inexpensive to manufacture, and durable in use.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A piston ring assembly for use in a Stirling engine, which comprises:

at least two pairs of main rings, said main ring having a thick side portion and a slanted surface, said slanted surface having a gradually increasing side thickness, said thick side portion of said main ring positioned opposing the thick side portion of the other main ring of said pair of main rings wherein the pair of main rings superpose one another for preventing one main ring from rotating against the other main ring, a slit disposed at the thick side portion of said main ring wherein said slit is positioned opposing the slit of the other main ring of said pair of main rings for preventing the operational gas in a cylinder from leaking, and a tension ring having a slit for closely contacting said main rings to the inside surface of said cylinder by tensional force thereof.

2. The piston ring assembly of claim 1, wherein said superposed main rings as a whole maintains a constant side ring thickness around the entire portion of said main rings.

* * * * *